United States Patent [19]
Pittet

[11] 3,808,451
[45] Apr. 30, 1974

[54] AC POWER CHANGEOVER

[75] Inventor: Rene E. Pittet, Marshall, Mich.

[73] Assignee: Progressive Dynamics, Inc., Marshall, Mich.

[22] Filed: Nov. 13, 1972

[21] Appl. No.: 305,665

[52] U.S. Cl. ................................ 307/64, 307/9
[51] Int. Cl. .............................. H02j 9/00
[58] Field of Search ............... 307/43, 64; 307/109

[56] References Cited
UNITED STATES PATENTS

| | | | |
|---|---|---|---|
| 2,410,678 | 11/1946 | Parkhurst | 307/64 |
| 3,489,912 | 1/1970 | Hoffman | 307/9 |
| 3,647,997 | 3/1972 | Nerem | 200/50 C |

Primary Examiner—Robert K. Schaefer
Assistant Examiner—M. Ginsburg
Attorney, Agent, or Firm—Beaman & Beaman

[57] ABSTRACT

A power changeover circuit for selectively connecting an electrical load to one of two available power sources, preferably alternating current sources, wherein one of the sources constitutes an engine driven generator requiring a predetermined time to reach specified output characteristics after energization. Relay operated changeover switch means selectively connects the load to either of the electrical power sources, and second switch means in series with the changeover switch located between the changeover switch and the engine driven power source delays connected of the generator source with the load after disconnection of the load from the other source until the generator output reaches specified characteristics. Further, the circuit provides for the disconnection of the load from the generator upon deenergization of the generator, and prior to the changeover switch connecting the load to the other supply source in order to prevent arcing. Relays, resistors and time delay switch devices are utilized in the circuit to provide the desired operation.

9 Claims, 2 Drawing Figures

PATENTED APR 30 1974    3,808,451

AC POWER CHANGEOVER

BACKGROUND OF THE INVENTION

The invention pertains to electrical changeover circuits wherein an electrical load is alternately connected to one of two power supply sources.

Electrical changeover circuits have been widely used in emergency systems wherein the electrical load is normally connected to a primary power supply, but is automatically switched to an auxiliary emergency power supply in the event of failure of the primary power source. Also, such circuits are commonly employed in the marine arts where vessels may employ a plurality of generators driven from the ship's main turbines, and auxiliary generator systems are connected to the propeller drive shaft. Conventional circuits of the above type may be found in U.S. Pat. Nos. 1,777,845, 2,911,541, 3,243,598 and 3,317,741.

In the usual electric power changeover circuit switching takes place between a primary electric power supply and either a generator or battery auxiliary power source, and relays, and similar electrical components are utilized to automatically produce the switching from one power source to the other upon failure of the primary source to energize the circuit. However, known changeover circuits have not met the needs of electrical systems utilizing primary supply sources and engine driven generator supply sources wherein the primary source is automatically disconnected from the load upon energization of the generator wherein such transfer of electrical power does not take place until the generator has achieved predetermined power output characteristics. Additionally, known changeover circuits do not provide a switching sequence which eliminates arcing, nor substantially eliminate other deleterious effects attendant with changeover circuit systems.

Recreational vehicles, such as motor homes, large campers and travel trailers, and also pleasure watercraft, often include small generating equipment in order to permit the vehicle or boat to be self-sufficient from a power standpoint when utility supplied primary or shoreline power is not available. Recreational vehicles and watercraft are increasingly utilizing 110 volt AC systems, and by the use of power converters both 12 volt and 110 volt appliances and lighting circuits are commonly employed. The use of auxiliary 110 volt AC generators on recreational vehicles and watercraft is becoming increasingly common.

Currently, with recreational vehicles and watercraft utilizing 110 volt AC generators, a foolproof switchover system is utilized to prevent starting of the generator when the primary power source is connected to the load system. Such foolproof changeover apparatus includes a power cord which must be removed from one receptacle and physically plugged into another, and such changeover requires that the operator physically change the conductor from one receptacle to another, which takes place exteriorly of the vehicle, resulting in considerable inconvenience, and danger due to electric shock, particularly during inclement weather. Situations arise where the shifting from a primary power supply to the engine driven supply may occur rather frequently, and the troublesome procedure involved in shifting from one supply to another leaves much to be desired. Also, with known changeover systems it is possible to impose reduced voltage upon the vehicle load system during starting of the generator prior to the generator reaching its full operating capacity, and such reduced voltages can damage some electrical components, such as motors, and if protection means are not incorporated into the generator circuit there is the possibility of serious damage occurring to the electrical equipment of the vehicle or watercraft due to relay chatter.

SUMMARY OF THE INVENTION

It is an object of the invention to provide an electrical changeover system selectively connecting at least two power sources to a load, wherein one of the power sources includes an engine driven generator, such that the changeover is automatically accomplished from a primary supply to the generator supply upon energization of the generator, and upon the generator substantially achieving designed output.

A further object of the invention is to provide an automatic changeover circuit for use with a load selectively powered from two power sources wherein sufficient time interval exists between transferring from one source to the other to prevent arcing switch contacts.

In the practice of the invention a two pole changeover switch is interposed between the load and the two power sources. At one position of the switch both the active and neutral wires of one power source are connected to the active and neutral conductors of the load. At the other position of the changeover switch the neutral and active wires of the load are connectible with the neutral and active conductors of the engine driven generator, however, a second switch is interposed in series between the changeover switch and the generator controlling energization of the load from the generator so that the load is not connected to the generator until the generator has reached sufficient output to assume the load and provide the proper voltage.

Also, the second switch has such operating characteristics as to open prior to shifting of the changeover switch upon deenergization of the generator. When the engine driving the generator is stopped, the voltage decay of the generator is first sensed by the second switch breaking the circuit to the changeover switch, and upon the voltage further decreasing the changeover switch is operated thereby connecting the load to the primary or shoreline supply after sufficient time has occurred to automatically quench any arcs which might have been produced at the changeover switch contacts.

Preferably, the power supplies are alternating current, and the changeover circuit utilizes current rectifying components wherein the switches are operated by DC relays. The use of DC relays prevents chattering of the relays, especially during decaying and build up of the generator voltage, and are preferable over an AC relay which will chatter and vibrate under such circumstances.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

It will be appreciated that the changeover circuit of the invention may be utilized in a wide variety of applications wherein various types of power sources may be utilized. For instance, while it is expected that the invention will find its primary area of utilization in conjunction with recreational vehicles and watercraft, the circuit may be utilized in any instance wherein a plurality of power sources are alternately used to energize a load, one of the power sources constituting an engine driven generator.

Figure 1:
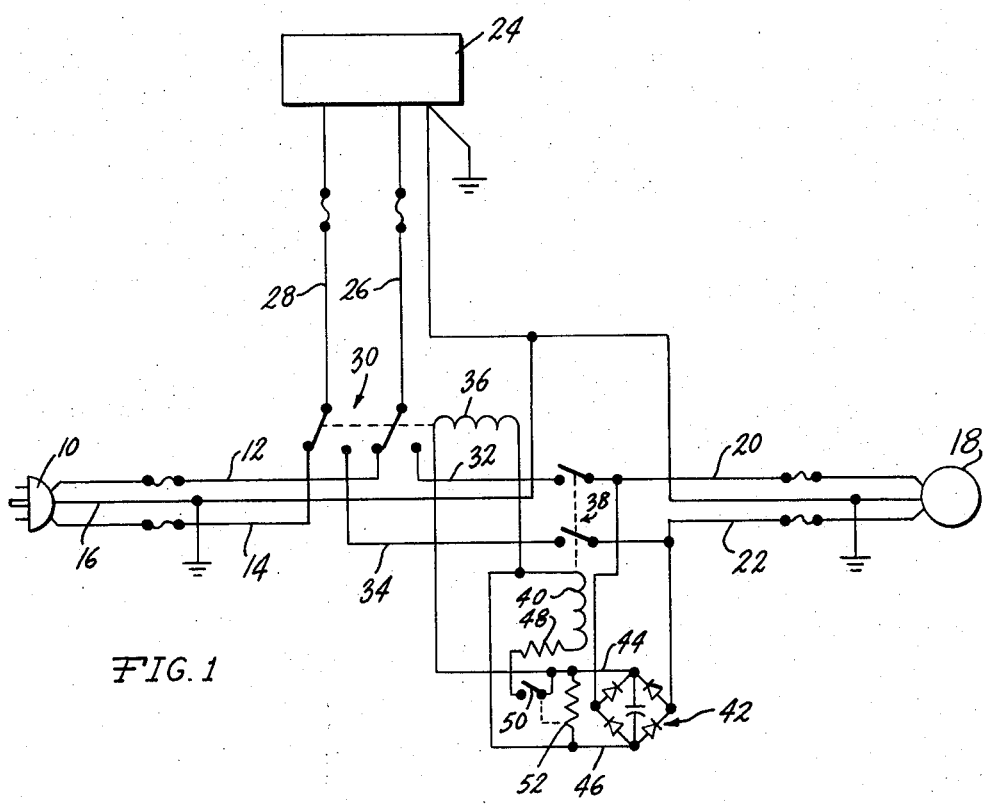
FIG. 1 is an illustration of an AC changeover circuit in accord with the invention, the switches being shown in the position connecting the load with the primary power source.

In FIG. 1 the primary power source is represented at 10, and includes an active conductor 12, a neutral conductor 14, and a ground conductor 16. Ground conductors are also utilized with the generator, and load and are illustrated, but not hereinafter mentioned. Usually, the supply 10 will be 110 volts AC, as is conventionally available at parks, camp grounds and marinas for connection to recreational vehicles and watercraft.

The other source of alternating current is the engine driven generator represented at 18 having an active output conductor 20, and a neutral conductor 22. The generator 18 has an operating output of 110 volts, and as used with recreational vehicles and small watercraft, the generator will be driven by a one or two cylinder internal combustion engine usually having a rating less than 20 horse power.

The load is represented at 24, and in the case of a recreational vehicle or watercraft, would consist of the complete 110 volt circuit of the vehicle or vessel. With recreational vehicles and watercraft it is common to supply 110 volt AC to a converter having a 12 volt DC output, which is also connected to a 12 volt battery. Many of the appliances of recreational vehicles and vessels are capable of operating on 12 volt DC such as lighting, refrigerators, etc., but it is also common to have 110 volt appliances, such as air conditioners, directly connected to the 110 volt load. The load includes an active conductor 26 and a neutral conductor 28.

The two pole changeover switch 30 includes terminals to which the primary supply conductors 12 and 14 are attached, and includes terminals to which conductors 32 and 34 are attached. The blades of the changeover switch 30 are operated by a relay coil 36, and in the normal position the switch 30 is closed, as represented in FIG. 1, establishing connection between the conductors of the primary alternating current supply 10 and the load 24.

A two pole switch 38 is connected to the generator active and neutral conductors 20 and 22, and includes terminals to which conductors 32 and 34 are connected. This switch is normally open, and is controlled by a relay coil 40. As the switch 38 is normally open, the connection between the changeover switch 30 and the generator 18 is normally open, and it will be therefore appreciated that both switches 30 and 38 must be energized in order to complete the circuit between the generator and the load.

It is desired that the switch relays 36 and 40 be operated by direct current, and for this purpose a full wave rectifier circuit generally indicated at 42 is connected to the generator output conductors 20 and 22, and provides direct current at the rectifier output conductors 44 and 46.

The relay coil 36 is directly connected to the output of the rectifier 42, and thus energization of the relay coil occurs immediately upon voltage being produced in the conductors 20 and 22 by the generator 18. Upon the voltage reaching a sufficient value the electromagnetic forces developed within the coil 36 shift the changeover switch 30 from the position shown in FIG. 1, to the position in FIG. 2 for establishing connection between the load and the generator.

The relay coil 40 is connected in series with resistance 48 which may be of 1,000 ohms, and is also in series with a time delay switch 50 having a heating element represented at 52. The switch 50 has a 45 second delay between energization and actuation.

By way of example, the relay switch 30 may comprise a Potter and Brumfield PM17DY relay, while relay switch 38 may comprise a Potter and Brumfield Model PR11DGO. The time delay switch 50 may be a Klixon PN60700A1-2, 1 amp.

Operation of the described circuit is as follows:

Assuming the load 24, as represented by the electrical system of a recreational vehicle or boat, is at a location where a primary supply of alternating current is available, the switches 30 and 38 will be in the condition shown in FIG. 1, and the load 24 will be directly receiving its electricity from the primary supply 10. The load is completely disconnected from the generator 18, and the contacts of switch 38 are open.

Figure 2:
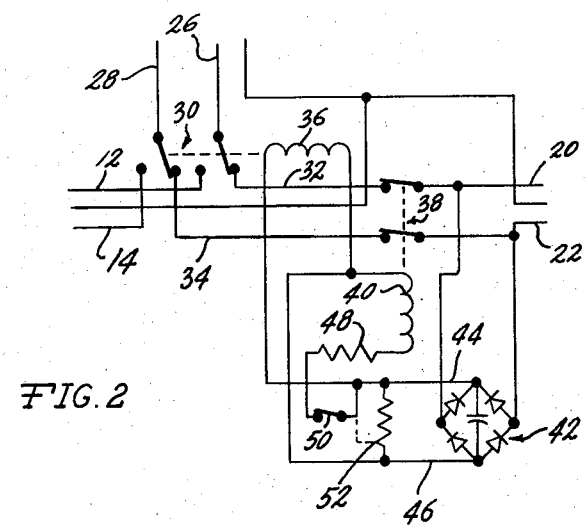
FIG. 2 is a partial view of the circuit illustrating the switches in the position for connecting the load to the generator power source.

If, while the primary power source is still connected, the operator starts the generator 18 by starting the internal combustion engine powering the generator, the rotation of the generator will produce an alternating current potential in the active conductor 20 thereby energizing the rectifier circuit 42 to produce a direct current energizing the relay coil 36 shifting the changeover switch to the position shown in FIG. 2. Operation of the switch 30 disconnects the load 24 from both the active and neutral conductors of the primary power source 10, and connects the load to the conductors 32 and 34. However, as the switch 38 is still open the load is not connected to the generator 18, and thus is not energized from the generator. At this time the recreational vehicle lighting, and other 12 volt appliances will be energized automatically from a battery source.

The generator 18 increases from 0 to 120 volts in approximately 4 seconds at a rate of 30 volts per second. Thus, at approximately one second after operation of the generator, sufficient voltage is produced to energize relay 36 to shift the changeover switch to the position shown in FIG. 2.

Forty-five seconds after the generator 18 has reached its maximum output the time delay switch element 52 will have heated sufficiently to cause the time delay switch 50 to close thereby energizing the relay coil 40 through the resistor 48. Energization of the relay coil 40 closes switch 38 establishing a completed circuit between the generator 18 and the load 24 permitting the load to be solely energized by the generator, and the battery supply will automatically be disconnected by the converter circuitry, not shown.

When it is desired to place the load back on the primary supply 10 the generator 18 is de-energized producing a voltage decay at a rate of approximately 30 volts per second. Approximately 3 seconds after the generator 18 is de-energized the resultant voltage drop causes the relay switch 38 to release breaking the circuit between the generator and the load. The presence of the resistor 48 produces a release or actuation of the relay switch 38 prior to the actuation of the changeover relay switch 30.

Approximately 4 seconds after the generator 18 is de-energized the voltage has decayed sufficiently to permit the relay switch 30 to shift, again positioning the switch 30 as shown in FIG. 1, reestablishing electrical connection between the primary power supply 10 and the load 24.

The sequential operation of the switches 30 and 38 has several purposes. First, when initially energizing the generator 18, the primary supply 10 will be disconnected from the load, yet the presence of the switch 38 prevents the partial voltage developed by the generator while attaining operating speed from being imposed on the load, and thereby possibly damaging electric motors, or other components constituting the load. Also, the generator is able to attain maximum output quickly under no load conditions.

Secondly, when the generator motor has been de-energized, and the voltage generated thereby is decaying, the fact that the switch 38 breaks the circuit between the generator and the load prior to the changeover switch connecting the load to the primary supply prevents arcing at the switch contacts, resulting in increased switch life, and elimination of the deleterious effects of switch arcing and relay chatter.

The switch 38 could be a single pole type connecting conductors 20 and 32, and conductor 22 could directly connect to a terminal at switch 30. Such a single pole switch is the most economical arrangement, and serves the desired purposes as described above.

FIG. 1 illustrates a circuit device for a 30 amp. load using a generator capable of producing a 30 amp. output. If the load is of a 60 amp. requirement, a 60 amp. generator is employed, and two 30 amp load circuits are employed. In such event a duplicate set of contacts similar to those changeover contacts of switch 30 are employed also operated by the coil 36, and wiring parallel to that illustrated is used such that both load circuits are simultaneously changed over from one power source to the other, and the switch 38 is connected in series with active conductors from the load circuits to the generator active conductor.

It will be appreciated that various similar modifications may be apparent to those skilled in the art without departing from the spirit and scope of the invention.

What is claimed is:

1. An electrical power changeover system comprising, in combination, a first supply of electrical current, a second supply of electrical current constituting an operator controlled engine driven generator, an electrical load, first switch means normally electrically connecting said load to said first supply and operable to connect said load to said second supply and disconnect said load from said first supply, second switch means in series with said first switch means between said first switch means and said second supply selectively controlling energization of said first switch means from said second supply, first switch control means controlling said first switch means in dependence upon the output of said second supply, second switch control means controlling said second switch means in accord with operation of said second supply, and means controlling at least one of said switch control means wherein said switch means operate at different times such that said load is not energized from said second supply until the load is disconnected from said first supply and said second supply attains predetermined voltage characteristics, and said load being disconnected from said second supply during de-energizing of said second supply prior to being connected to said first supply by a time interval sufficient to prevent arcing at said first switch means.

2. An electrical power changeover system comprising, in combination, a first supply of electrical current, a second supply of electrical current constituting an operator controlled engine driven generator, an electrical load, a first switch selectively electrically connecting said load to said first and second supplies and normally connecting said load to said first supply, a second normally open switch electrically interposed between said second supply and said first switch in series with said first switch, first control means operating said first switch upon energization of said second supply to permit connection of said load to said second supply, and second control means closing said second switch after a predetermined time interval after energization of said second supply to connect said load to said second supply and opening upon de-energization of said second supply and prior to operation of said first switch to connect said load to said first supply.

3. An electrical power changeover system as in claim 2 wherein said second control means includes time delay means delaying operation of said second switch a predetermined time interval after energization of said engine driven generator.

4. An electrical power changeover system as in claim 2 wherein said second control means includes an electromagnetic relay and a resistance in series with said relay causing de-energizing of said relay and opening of said second switch at a higher voltage output of said second supply than the voltage required to operate said first control means to open said first switch.

5. An electrical power changeover circuit comprising, in combination, a first supply of electrical current having an active conductor and a ground conductor, a second supply of electrical current having an active conductor and a ground conductor comprising an operator controlled motor driven generator, a load having active and ground conductors, first relay switch means controlled by said second supply for selectively connecting said load active and ground conductors to said active and ground conductors, respectively, of said first and second supplies of electrical current, said first relay switch means normally connecting said load conductors to corresponding conductors of said first supply, and connecting said load conductors to corresponding conductors of said second supply upon energizing of said motor driven generator and disconnecting said load conductors from said second supply conductors upon the output of said motor driven generator falling below the operating voltage of said first relay switch means, second switch means located in at least one of said conductors of said second supply of electrical current, and means energized from said second supply closing said second switch means upon said motor driven generator second supply attaining a predetermined voltage output upon being energized and opening said second switch means upon said motor driven generator being de-energized and prior to said first switch means disconnecting said load conductors from said second supply conductors.

6. In an electrical power changeover circuit as in claim 5 wherein said means opening and closing said second switch means comprises a time delay switch controlling said second switch means.

7. In an electrical power changeover circuit as in claim 6, a resistor in series with the circuit of said time delay switch causing said second switch means to open prior to operation of said first switch means to connect said load conductors to said first supply conductors.

8. In an electrical power changeover circuit as in claim 5 wherein said first and second supplies of electrical current provide alternating current, current rectifying means connected to said second supply producing a direct current output, said first relay switch means being connected to said rectifying means output.

9. In an electrical power changeover circuit as in claim 8 wherein said second switch means comprises a relay, and conductors selectively connecting said second switch relay to said rectifying means output.

* * * * *